United States Patent
Gutierrez et al.

(10) Patent No.: US 6,219,145 B1
(45) Date of Patent: Apr. 17, 2001

(54) INTERFEROMETRIC SYSTEM FOR PRECISION IMAGING OF VIBRATING STRUCTURES

(75) Inventors: Roman C. Gutierrez, La Crescenta; Kirill V. Shcheglov; Tony Tang, both of Glendale, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/251,582

(22) Filed: Feb. 16, 1999

Related U.S. Application Data

(60) Provisional application No. 60/074,902, filed on Feb. 17, 1998.

(51) Int. Cl.⁷ .................................................. G01B 11/02
(52) U.S. Cl. .......................................... 356/498; 356/244
(58) Field of Search ...................... 356/358, 244; 73/656

(56) References Cited

U.S. PATENT DOCUMENTS

| | | | |
|---|---|---|---|
| 3,572,936 | * 3/1971 | Johnson et al. | 356/109 |
| 3,899,921 | * 8/1975 | Hockley | 73/67.2 |
| 4,310,245 | * 1/1982 | Pritchard | 356/345 |
| 4,313,679 | * 2/1982 | Wolff et al. | 356/244 |
| 4,689,993 | * 9/1987 | Slettemoen | 73/579 |
| 4,999,681 | * 3/1991 | Mader | 356/347 |
| 5,706,084 | * 1/1998 | Gutierrez | 356/351 |
| 5,990,473 | * 11/1999 | Dickey et al. | 250/231.13 |
| 6,154,270 | * 11/2000 | Ozawa | 355/53 |

* cited by examiner

*Primary Examiner*—Frank G. Font
*Assistant Examiner*—Phil Natividad
(74) *Attorney, Agent, or Firm*—Fish & Richardson PC

(57) ABSTRACT

An optical profiler is modified in a way which allows it to image a MEMS device at various points during the movement of the MEMS device. The light source is synchronized with a desired movement of the MEMS device. The light source produces pulse at each synchronization period. During each pulse, an interferometric measurement is carried out. So long as the pulse is short enough such that the device does not move significantly, a detection of the position of the device can be accurately obtained.

22 Claims, 1 Drawing Sheet

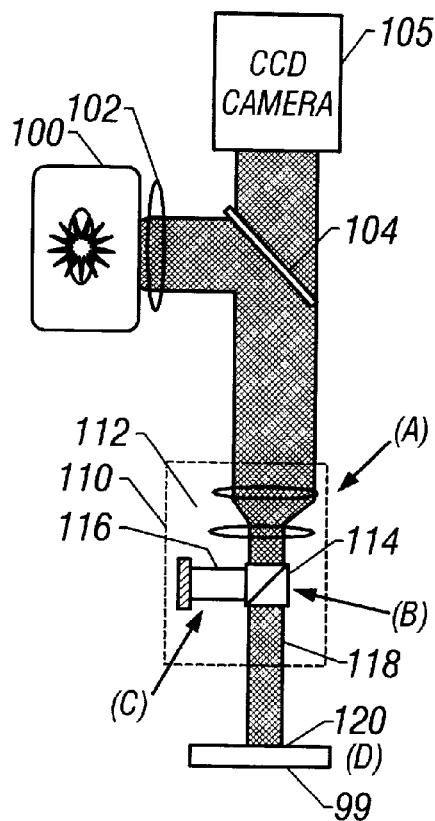
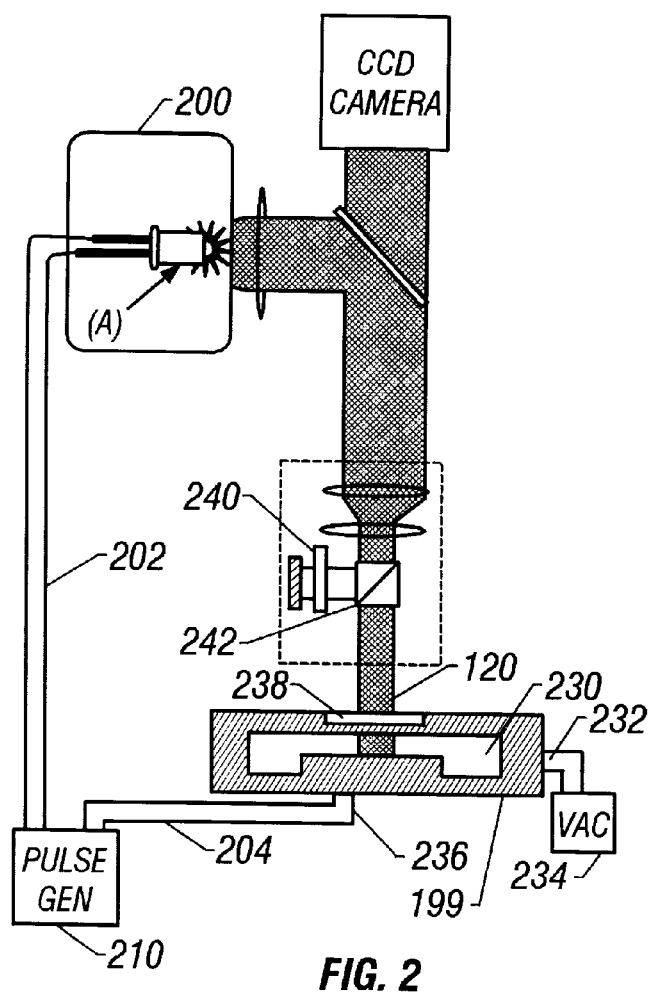
FIG. 1
*(Prior Art)*
FIG. 2
*(Prior Art)*

INTERFEROMETRIC SYSTEM FOR PRECISION IMAGING OF VIBRATING STRUCTURES

CROSS REFERENCE TO RELATED APPLICATIONS

This application claims priority from Provisional Application U.S. Ser. No. 60/074,902, filed Feb. 17, 1998.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

BACKGROUND OF THE INVENTION

It is often desirable to quantitatively measure the motion of a structure. This can be carried out using various instruments. A particularly useful family of said instruments uses optical techniques.

U.S. Pat. No. 4,619,529, issued Oct. 28, 1986, "Interferometric contact-free measuring method for sensing motional surface deformation of workpiece subjected to ultrasonic wave vibration", teaches a method for observing sound waves on a workpiece by interfering two beams that are reflected from different points on the workpiece. The pulsing relates to the pulsed laser beam that generates the sound waves on the workpiece. The interferometer beams are not pulsed.

U.S. Pat. No. 3,572,936, issued Mar. 30, 1971, "Stroboscopic Interferometric Holography", and U.S. Pat. No. 4,999,681, issued Mar. 12, 1991, "Real-time holographic interferometry with a pulsed laser and flicker-free viewing", teach two methods for producing a hologram of a vibrating object by using stroboscopic illumination. The motion is determined from the generation of a second reference hologram of the rotated object or the object at rest. The second hologram is produced as a second image of the first hologram to produce a interference that determines the motion.

A publication by O. Kwon et al, Opt Lett 12: (11) 855–857 November 1987, teaches a method of pulsed source interferometry. A conventional interferometer is equipped with a Q-switched Nd: YAG laser which is capable of generating high intensity pulses. This is necessary since the authors use only a single pulse to record the interferometric fringe pattern with a camera. The limitation to using a single pulse is overcome by the use of a grating to generate three interferograms which are acquired simultaneously by three cameras. In addition two gratings are used to generate the required phase shifts, restricting the source to be monochromatic due to the inherent chromatic dispersion of a grating.

A publication by S Nakadate et al.,Opt Acta 33: (10) 1295–1309 October 1986, teaches holographic interferometry. There are many other systems which do the same. In these methods, the contours of vibration amplitude are given as a fringe pattern.

One particularly useful device is based on optical interference using, e.g., a Michaelson Interferometer.

For example, an optical profiler is available from the company WYKO, under the name of WYKO RST Plus Optical Profiler. This is a scanning imaging white light interferometer. A block diagram of the device has the structure shown in FIG. 1. An incandescent light source 100 is focused through lens 102 to half mirror 104. The light is reflected down to a microscope 110. The light passes through microscope objective 112, to a beam splitter 114. The beam splitter 114 produces a reference beam 116 that is reflected to eventually recombine with the reflected object beam.

The object beam 118 passes to the object being imaged at 120, and is reflected. This beam then recombines with the reference beam 116, to produce an interference. A CCD video camera 125 images the operation. This system has the ability to detect minute features on the surface of the sample 99.

SUMMARY OF THE INVENTION

The present inventors recognized that this instrument as configured is capable of analyzing only stationary structures. Any vibration on the sample blurs the interference pattern. This prevents the sample from being accurately analyzed.

The present disclosure teaches an instrument that allows interferometric detection of moving structures. This is done by pulsing the output.

According to the present system, the optical profiler is modified to allow it to image certain vibrating structures, and specifically microelectrical machined (MEMS) devices.

The present disclosure teaches a method and an instrument for determining periodic motion of structures, specifically micromachined structures. The instrument is an imaging interferometer equipped with a pulsed illumination source. The illumination source is pulsed synchronously and with a predetermined relationship to the motion of the structure thus immobilizing what would otherwise be a rapidly changing interference pattern which is imaged by a camera.

In a preferred mode, every frame output by a camera represents an average (integral) of interference patterns during multiple cycles of object motion. The interference pattern images are acquired and processed to recover the modeshape —the "picture of the motion" of the structure.

BRIEF DESCRIPTION OF THE DRAWINGS

These and other aspects will be described in detail with respect to the accompanying, wherein:

FIG. 1 shows a diagram of the prior art optical profiler; and

FIG. 2 shows a modified instrument including improved structure for imaging moving devices.

DESCRIPTION OF THE PREFERRED EMBODIMENTS

FIG. 2 shows the modified device. The light source in this device is preferably a light source with low thermal inertia that can be modulated at rates higher that 10 KHz, and preferably higher than 1 MHz. A preferred light source is an ultrabright, light emitting diode ("LED"), which produces 0.05 watts of output. This LED can be turned on and off at rates up to about 2 MHZ.

A pulse generator 210 is provided which produces a pulse output that modulates the LED.

The system described herein also is used to detect movements, e.g. vibrations, of micromachined structure 199. The micromachined structure 199 is driven to vibrate. The driving is preferably done by a signal generator that drives the pulse generator that drives the LED. A phase offset, shown as φ, exists between the two outputs 202 which drives the LED and 204 which drives the micromachined structure 199. This phase offset can be used to change the point in the vibration cycle of the micromachined device 199 at which the visual image is acquired.

The visual image is acquired by driving the LED to produce strobes of light. Each pulse of the LED strobe illuminates both the object to be imaged and the reference surface. The interference between the two illuminations enables determination of position. Since the pulse of the strobe is short, the device, even if moving, will not have moved much during the strobe. This avoids blurring of the interferometric measurement.

In a particularly preferred embodiment, the MEMS device which is imaged is a cloverleaf-type rotary vibration sensor.

The inventors also found that many MEMS devices, including the one that is preferably imaged herein, vibrates differently under atmospheric pressure or might not vibrate at all under such pressure. This can be caused by excessive viscous drag on the micromachined structure. Accordingly, the operation of the present system includes a vacuum chamber 230 provided to house the sample. The vacuum chamber includes a vacuum port 232 connected to a vacuum source 234. The vacuum source evacuates the air from the chamber 230. The MEMS device 199 to be detected is located in the chamber 230. The vacuum chamber 230 also includes a wire port 236 allowing wires to be connected so that the signal generator 210 can vibrate and/or actuate the MEMS device 199.

The sample beam 120 in this embodiment therefore encounters an additional glass plate: the viewport 238. In order to compensate for the effects of the viewport, a compensating plate 240 is placed into the reference arm 242 of the Michelson interferometer. The compensating plate is of the same thickness as the glass viewport 238. This compensates for the extra glass in the path caused by the vacuum chamber.

In order to accurately detect the movement of the MEMS device 199, it is necessary to modulate the light source at a synchronized modulation rate, that is synchronized to the movement of the MEMS device 199. Movement of the device during the illumination pulse could cause blurring of the fringe of the interference pattern. Therefore, the duty cycle of the source should be shortened as the vibration amplitude increases. The device should not move more than a distance of about ½0th of the center wavelength of the source, during the illumination pulse. Hence, for a structure vibrating at 10 kHz with a 10 $\mu$m amplitude, this translates into a maximum pulse width of about 200 nsec, or about a 0.2% maximum duty cycle. The overall integrated light intensity of a frame using illumination with such a short duty cycle may be very small.

The pulse rate of the light source should be at least a factor of 10 lower than the lowest modulation rate of the light source. As explained above, the light source must be modulable at least at 10 Khz.

If the amount of incoming light is too small, or to improve the noise, the system can integrate over a larger number of periods. Presumably, the image obtained during each period is substantially the same. Hence, by integrating a number of these images, the light output can be increased.

A processor calculates the relationship between the interference fringes, and uses that to determine the position of the device. This is done in a conventional way. The phase between motion and light pulse can be varied to image the device at different points in its periodic motion. The processor then calculates all of these different positions.

Superluminescent LEDs, a cluster of conventional LEDs, or a laser could be used to further improve the brightness.

Although only a few embodiments have been disclosed in detail above, those of ordinary skill in the art should certainly understand that modifications are possible in the preferred embodiment without departing from the teachings hereof. All predictable modifications are intended to be included. For example, while the present system describes only modifying a single optical profiler, it should be understood that other optical profilers can also be modified. For example, any optical profiler which uses an imaging interferometer could be modified in this way. More generally, however, any measurement detecting structure which detects using optical operations could be detected in this way.

The operation describes using a single pulse generator, but of course two separate pulse generators could be used, with one triggered from the other.

Moreover, the system herein describes using a superluminescent LED as the light source. However, any light source which can be modulated at a high enough rate can be used.

All such modifications are intended to be encompassed within the following claims in which:

What is claimed is:

1. An optical measuring device, comprising:
   a pulsating light source;
   an interferometer measuring element, that uses imaging interferometry to measure a position of an object; and
   an object moving device, moving said object while said position is being measured.

2. A device as in claim 1, further comprising a synchronization device, which synchronizes said moving with said pulsation of said light source.

3. An optical measuring device, comprising:
   a chamber, having a transparent viewport, and a holding element for an object to be measured inside said chamber;
   an interferometer measuring element, that uses imaging interferometry to measure a position of the object while in said chamber by forming a main arm including said object, and a reference arm that does not include said object, wherein said reference arm includes a pulsating light source.

4. A device as in claim 3, wherein said reference arm includes a compensating plate that compensates for optical effects of said viewport.

5. A device as in claim 4, further comprising an object moving device, moving said object while said position is being measured.

6. An optical measuring device, comprising:
   a light source capable of modulation at a rate greater than 10 Khz;
   a sample interface device, adapted to hold a sample to be imaged, and including an ability to move said sample at a predetermined repetition rate;
   a signal generator, producing a pulse output for said light source, and a periodic signal output for said sample interface device, said outputs having a predetermined relationship with one another; and
   an interferometer movement detecting device, producing, at each pulse of light output from said light source, an interferometric measurement of a position of a sample on said sample interface device.

7. A device as in claim 6, wherein said interferometric device comprises a first arm producing a sample beam, and a second arm producing a reference beam, and producing an interference between said sample and reference beams.

8. A device as in claim 7, wherein said sample interface device includes an enclosed area, with a transparent viewport through which said sample beam enters; and a compensating plate, placed in said reference arm, to compensate for effects of said viewport.

9. A device as in claim 7, wherein said interferometer is a Michelson interferometer.

10. A device as in claim 7, further comprising a camera, imaging results of said interferometer movement detection device.

11. A device as in claim 7, wherein said sample is a MEMS device, and said signal generator is capable of varying a phase between said light source and said movement of said MEMS device.

12. A device as in claim 7, wherein said pulse generator produces a strobe output, having a pulse width during which the sample will not move more than a distance of about $\frac{1}{20}^{th}$ of a center wavelength of the light source.

13. A device as in claim 12, further comprising a camera, acquiring said interference.

14. A device as in claim 12, further comprising a processor, measuring said interference, and integrating the measuring over a plurality of cycles.

15. An optical measuring device, comprising:

a light emitting diode;

a sample interface device, adapted to hold a sample to be imaged, and including a vacuum-tight chamber with a transparent viewing portion, and including an ability to move said sample at a predetermined repetition rate;

a signal generator, producing a pulse output for said light emitting diode to produce a pulse of light from said light emitting diode, and a periodic signal output for said sample interface device, said outputs having a predetermined phased relationship with one another such that said pulse of light occurs at a predetermined point in a movement of said sample; and an interferometer movement detecting device, producing an interferometric measurement of a position of a sample on said sample interface device based on reflections of light from said light source, said interferometer movement detecting device including a reference arm with a compensating plate therein that compensates for the effect of said transparent viewing portion.

16. A device as in claim 15, wherein said interferometer movement detecting device integrates said reflections for a plurality of said pulses of light.

17. A method of measuring a characteristic of a moving device using optical interferometry, comprising:

moving a sample to be imaged at a predetermined repetition rate;

illuminating said sample using pulses of light, that occur for time periods that are short enough that said sample will not have moved more than a distance of about $\frac{1}{20}^{th}$ of a center wavelength of each pulse of light during each pulse; and guiding said pulses of light both to said sample, and to a reference arm, and obtaining an inteference fringe between reflections of light.

18. A method as in claim 17, wherein said illuminating produces pulses more frequently than 1 kHz.

19. A method as in claim 17, further comprising placing said sample in an enclosed area, with a transparent viewport; and compensating for optical effects of said viewport.

20. A method as in claim 17, further comprising varying a phase between said light source and said movement of said sample.

21. A method as in claim 17, further comprising integrating the measuring over a plurality of cycles.

22. A method as in claim 19, further comprising evacuating said enclosed area.

* * * * *

(12) EX PARTE REEXAMINATION CERTIFICATE (6426th)
United States Patent
Gutierrez et al.

(10) Number: US 6,219,145 C1
(45) Certificate Issued: Sep. 9, 2008

(54) INTERFEROMETRIC SYSTEM FOR PRECISION IMAGING OF VIBRATING STRUCTURES

(75) Inventors: Roman C. Gutierrez, La Crescenta, CA (US); Kirill V. Shcheglov, Glendale, CA (US); Tony Tang, Glendale, CA (US)

(73) Assignee: The United States of America as represented by the United States National Aeronautics and Space Administration, Washington, DC (US)

Reexamination Request:
No. 90/006,943, Feb. 18, 2004

Reexamination Certificate for:
Patent No.: 6,219,145
Issued: Apr. 17, 2001
Appl. No.: 09/251,582
Filed: Feb. 16, 1999

Related U.S. Application Data

(60) Provisional application No. 60/074,902, filed on Feb. 17, 1998.

(51) Int. Cl.
*G01B 9/02* (2006.01)

(52) U.S. Cl. .................................. 356/498; 356/244
(58) Field of Classification Search .............. 356/489, 356/495, 511–516, 244; 73/656
See application file for complete search history.

(56) References Cited

FOREIGN PATENT DOCUMENTS

JP          1995/72005          3/1995

OTHER PUBLICATIONS

Nakano et al., "Fringe Scanning Interferometric Imaging of Micro–Vibration Distribution Using Semiconductor Pulsed Laser (translated English Title)", The Society of Instrument and Control Engineers Article Compilation, vol. 31, No. 4, 454/460 (1995) and translation.

*Primary Examiner*—Hwa (Andrew) Lee

(57) ABSTRACT

An optical profiler is modified in a way which allows it to image a MEMS device at various points during the movement of the MEMS device. The light source is synchronized with a desired movement of the MEMS device. The light source produces pulse at each synchronization period. During each pulse, an interferometric measurement is carried out. So long as the pulse is short enough such that the device does not move significantly, a detection of the position of the device can be accurately obtained.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–5, 8, 15, 16, 19 and 22 is confirmed.

Claims 1, 2, 6, 7, 9–14, 17, 18, 20 and 21 are cancelled.

\* \* \* \* \*